Patented Aug. 26, 1947

2,426,349

UNITED STATES PATENT OFFICE 2,426,349 p-CHLORO-ACETOPHENONE SEMI-CARBAZONE AS AN INSECTICIDE

Samuel I. Gertler and Herbert L. J. Haller, Washington, D. C., assignors to the United States of America, as represented by the Secretary of Agriculture No Drawing. Original application December 7, 1943, Serial No. 513,220. Divided and this application September 27, 1945, Serial No. 619,013

2 Claims. (Cl. 167—30)

(Granted under the act of March 3, 1883, as amended April 30, 1928; 370 O. G. 757)

This application is made under the act of March 3, 1883, as amended by the act of April 30, 1928, and the invention herein described and claimed, if patented, may be manufactured and used by or for the Government of the United States of America for governmental purposes without the payment to us of any royalty thereon.

This is a division of our copending application for patent, Serial No. 513,220, filed December 7, 1943, now U. S. Patent 2,388,684 and copending application being a continuation in part of our application for patent, Serial No. 360,360, filed October 9, 1940.

This invention relates to improvements in materials for destroying or checking the growth or multiplication of living organisms, whether plant or animal which are economically injurious to man.

An object of the invention is to provide materials suitable for use as insecticides.

Another object of the invention is to provide a material for dusting or spraying delicate vegetation, such as bean plants, peach trees, and plants grown under glass, which will not cause injury to foliage.

Another object of the invention is to provide a material which is relatively nontoxic to man and domestic animals when taken by mouth, and which can be used in place of lead arsenate and other arsenicals for destroying insects, without leaving harmful residues on fruits and vegetables.

We have found that p-chloracetophenone semicarbazone has a specific toxic effect upon insects, and our invention consists in the application of this substance to the destruction of insect pests.

The insecticidal material may be reduced to an impalpable powder by grinding and applied to vegetation either dry as a dust or made into a spray. When applied as a suspension and used as a spray, it may be desirable to incorporate wetting agents, such as sodium lauryl sulfate, or any derivative of sulfosuccinic acid and an alkyl aryl sulfate. Stickers may also be incorporated, such as casein, soybean flour or fish oil. The spray may be made by mechanically suspending the impalpable powder or by first absorbing it in an appropriate solvent, such as acetone, methyl alcohol, or ethyl alcohol, and pouring the resulting solution into water, whereupon a fine colloidal suspension is obtained. The suspension may then be applied directly to the host plant or combined with a suitable wetting agent or adhesive, such as those mentioned above, and then sprayed.

The insecticidal material when used as a dust may be adsorbed on or mixed with a suitable diluent, such as clay, talc, bentonite, etc.

The insecticidal material may also be employed in admixture with other known insecticides, such as pyrethrum, derris, nicotine, arsenicals, etc.

p-Chloroacetophenone semicarbazone gave practically the same percentage of kill after 48 hours as the same concentration of derris, against the newly hatched larvae of the European corn borer. It was somewhat more effective than lead arsenate against the coddling moth. When used against the Hawaiian beet webworm of the fifth instar, it gave a 96% kill in 72 hours. Against the melon worm of the fourth instar, it showed about the same toxicity as derris after 72 hours.

It is to be understood that the above-mentioned compound is merely used as an example and that this invention is not restricted to such use. Also, the above example is not be construed as limiting either the method of application of this novel insecticide or the kinds of insects to which it may be applied.

Having thus described our invention, we claim:

1. An insecticidal dust composition comprising p-chloroacetophenone semicarbazone in the form of an impalpable powder admixed with a solid diluent.

2. A method for destroying insects comprising subjecting the insects to the action of p-chloroacetophenone semicarbazone.

SAMUEL I. GERTLER.
HERBERT L. J. HALLER.

REFERENCES CITED

The following references are of record in the file of this patent:

Dictionary of Organic Compounds, by Heilbron, 1943 ed., vol. I, page 15. (Copy in Div. 59.)